March 5, 1935.  J. CIOCIA  1,993,360
TRIMMING SHEARS
Filed Nov. 1, 1933  2 Sheets-Sheet 1
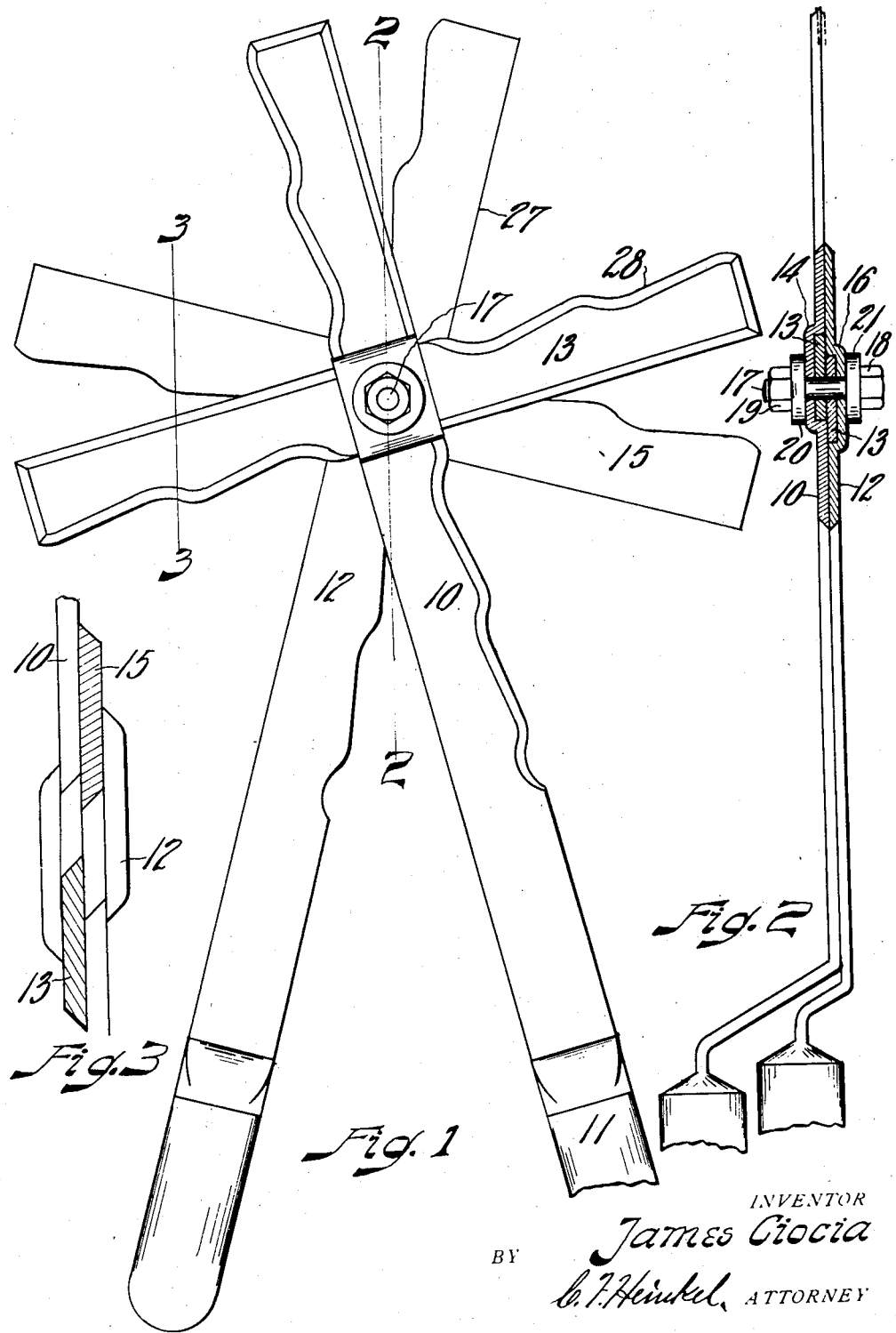
INVENTOR
James Ciocia
BY
C. F. Heinkel, ATTORNEY March 5, 1935. J. CIOCIA 1,993,360
TRIMMING SHEARS
Filed Nov. 1, 1933 2 Sheets-Sheet 2
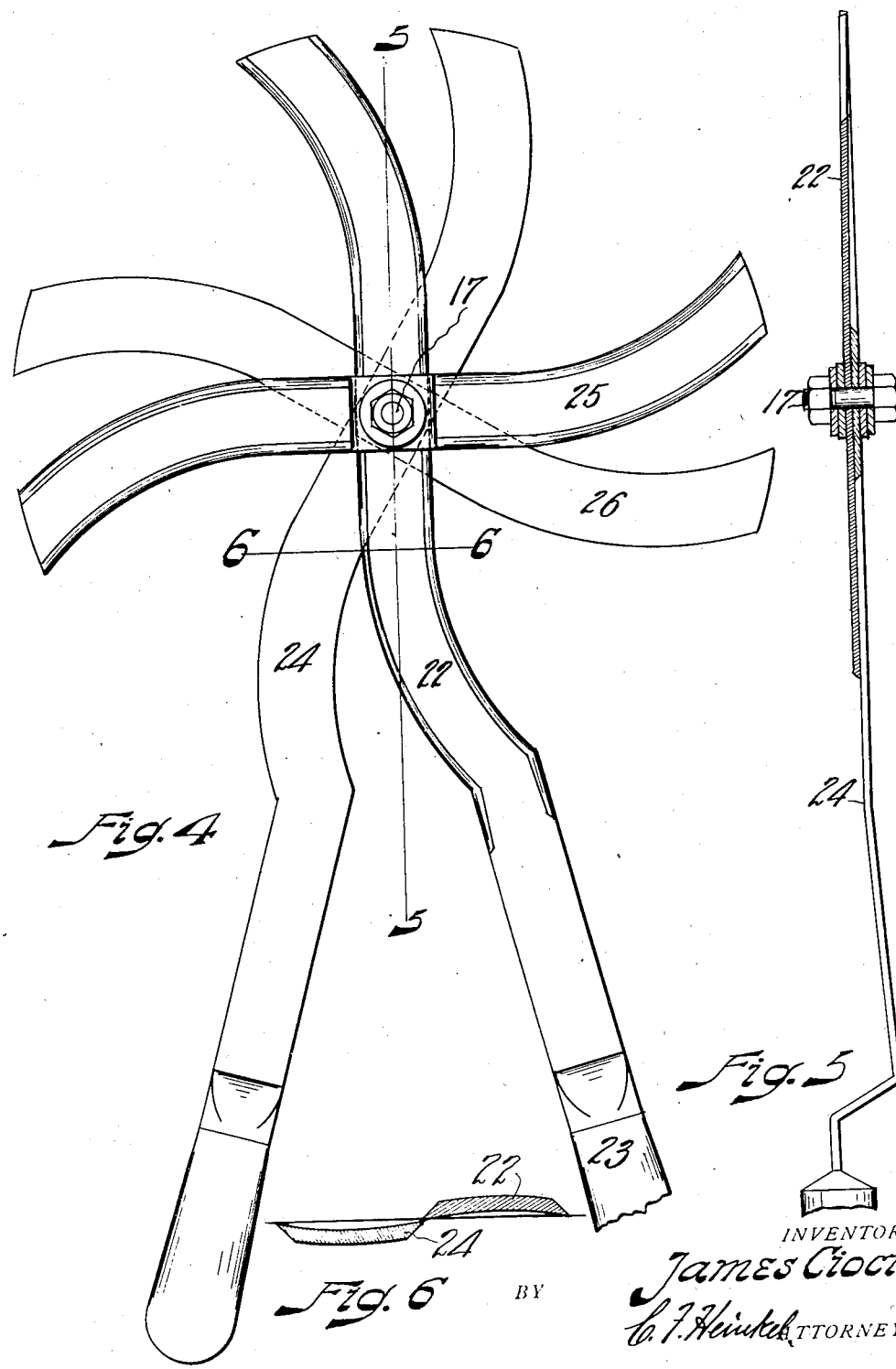
INVENTOR
James Ciocia
C. J. Heinkel ATTORNEY Patented Mar. 5, 1935

1,993,360

UNITED STATES PATENT OFFICE 1,993,360

TRIMMING SHEARS

James Ciocia, Cleveland, Ohio

Application November 1, 1933, Serial No. 696,205

5 Claims. (Cl. 30—11)

The present invention relates to shears generally and more particularly to trimming shears such as are used for hedges, shrubbery, and the like.

Objects of the present invention are:

To provide a trimming shears which cuts faster and more evenly than the usual trimming shears; which has means thereon to act as a guide for the same to trim a hedge or the like straightly and evenly; which cuts cleaner than the usual trimming shears; and which is self sharpening by operation thereof.

Other objects will be pointed out in this specification or will become obvious or apparent upon an inspection of this specification and of the accompanying drawings.

Trimming shears, as usually made, have one pair of pivoted together co-operating shearing knives and the cutting edges are on one side of the pivot thereof. The present invention uses cutting edges on both sides of the pivot thereof. Trimming shears usually have one pair of co-operating cutting edges. The present invention provides a plurality of pairs of cutting edges all operating in one plane. Trimming shears as usually made have a cutting edge only on one side of the knives. The present invention provides a cutting edge on each side of the knives. Trimming shears as usually made have straight cutting edges. The present invention provides sinuous cutting edges and may provide them on all of the knives and on both sides thereof or on one side and leaving the other side straight or without sinuous formation thereof. Trimming shears as usually made have the knives thereof of straight formation. The present invention provides curved knives with the edges thereof formed as described above.

In the present invention, one pivot pin holds all of the knives together. The knives can operate when the handles are moved either toward each other or away from each other. The sinuous formation of the cutting edges as well as the curved formation of the knives is a decided advantage in that heavier stems of hedges and the like will not slip away from the cutting edges so easily and the shears will be held to its cut more effectively than heretofore.

The present invention is illustrated in the accompanying drawings which show two types of trimming shears each embodying the present invention.

In the accompanying drawings:

Fig. 1 is a plan view of a shears embodying the present invention and shows eight cutting knives, each knife having a cutting edge on each longitudinal side thereof, one edge is straight and the other or opposite edge is sinuous.

Fig. 2 is a section taken on line 2—2 of Fig. 1 and shows structure and arrangement of knives more clearly.

Fig. 3 is a transverse section taken on the line 3—3 of Fig. 1 to show knife relations more clearly.

Fig. 4 is a plan view of a shears also embodying the present invention and also shows eight cutting knives each of double curvature and cutting edges on both sides of the knives.

Fig. 5 is a section taken on line 5—5 of Fig. 4 and shows relation of knives.

Fig. 6 is a transverse section taken on the line 6—6 of Fig. 4 and shows transverse relation of knives.

Similar reference characters refer to similar parts throughout the view pertaining to each other.

The shears shown in Figs. 1, 2 and 3 has eight shearing knives herein explained as being paired although there is no definite pairing of any of them since knives may pair with different knives when the shears are operated to cut both ways that is to say when the handles thereof are moved toward and away from each other.

The knife 10 is extended downwardly to form an operating handle 11 thereon. This handle may be a piece or a wooden handle or of any suitable material and formation. The object of the handle being to operate the knife in the manner of usual shears.

The knife 12 is a substantial duplicate of the knife 10.

The cross knife 13 is shown at right angles to the knife 10 and as being sunk thereinto at the crossing thereof. The knife 10 being bent at 14 for that purpose where the knives cross each other so that the inner face of the knife 13 is flush with, or in the same plane as the inner face of the knife 10.

The cross knife 15 is shown at right angles to the knife 12 and as being sunk thereinto at the crossing thereof. The knife 12 is bent at 16 for that purpose where the knives cross each other so that the inner face of the knife 15 is flush with, or in the same plane as the inner face of the knife 13.

The pivot pin 17 extends through all of the knives substantially at the middle of the knife parts thereof and has the head 18 on one end thereof and the nut 19 threaded onto the other end thereof. The pivot pin 17 acts as a pivot for all of the knives to swivel or rotate thereon or thereabout. The knives can be and are adjusted by means of the nut 19 to keep the below described edges in correct co-operating relation to each other. Either one or both of the washers 20 and 21 may be lock washers or some kind of a spring washer if desired.

The shears shown in Figs. 4, 5 and 6 has the knives curved as distinguished from the straight knives of Fig. 1.

The knife 22 has the handle 23 at the lower end thereof and the knife 24 is similar in structure to the knife 22. The knife 25 is square across the knife 22 and is bent upwardly and over the knife 22 at the juncture of the two knives to hold the same in square relation. The knife 26 is square across the knife 24 and is bent downwardly and over the knife 26 to hold these two knives in square relation. The object of this structure being not only to form the joint but also to bring the cutting edges of all of the knives into the same plane. The pivot pin 17 and washers described above are also used in this structure.

The handles of both of the shears shown are offset to different distances so that the same can pass each other when the shears are operated both ways.

As is shown, the knives are pivoted together at or near the middle thereof by means of the pivot pin 17. Each of the knives has a cutting edge on each longitudinal side thereof. In Figs. 1, 2, and 3, the knives are shown as being flat transversely whereas Figs. 4, 5, and 6 show the knives to be curved transversely.

The edges 27 of each of the knives of Fig. 1 are shown as being straight whereas the opposite edges 28 are sinuous or wavy to better grip material to be cut and to better hold the shears to its cut and to produce a smoother cut. This same idea may also be carried out in the shears of Fig. 5. One of the edges may follow the curvature of the knife and the opposite edge may be made sinuous. It is, of course, obvious that the sinuous formation of the edges may be carried out on the straight edges also.

The knives are, preferably, made of spring steel to provide some resiliency therein so that the same will co-operate in cutting and the cutting edges will always rub on each other during cutting and thereby produce a smooth cut and renders the shears practically self sharpening during use thereof. As shown, at the top of Figs. 2 and 5, the knives are first formed so that the outer end of the edges are respectively above and below the plane upon which the same are to cut when the same are open. The resiliency of the knives will cause the same to recede during cutting thereby and thereby keep the edges in contact as the handles are moved toward and away from each other for cutting. This principle is well known in shear structure.

The transverse curvature of the knives as shown in Fig. 6 always affords edge to edge contact of the knives as they become paired. The transversely flat knives as shown in Fig. 3 have the disadvantage of preventing edge to edge contact when the edges become dull and the body part of the knives will keep the edges apart.

Each of the knives with a handle thereon has secured thereon another knife substantially at right angles thereto so that movement of a handle moves the knives thereon and also the knives crosswise thereof. When the handles are moved toward each other, the knives connected with one of the handles move or swivel about the pivot pin in one direction while the knives connected with the other handle move or swivel about the same pivot but in the opposite direction. This causes pairing of the knives for cutting thereby.

When the handles are moved away from each other, the knives with the handles thereon swivel toward the cross knives and thereby form pairs for cutting thereby. In this manner, the shears is made double acting so that the same do cut when the handles are moved toward each other or away from each other.

The arrangement of the knives also acts as a guide for the shears both horizontally and vertically so that a line of trimming can easily be followed.

Changes in structure as well as in arrangement of elements can be made within the scope and intent of the appended claims. Suggestions as to possible changes are indicated in this specification.

Therefore, without limiting myself to the precise structure and arrangement of parts as shown and described,

I claim:

1. In a hand operated, double acting hedge trimming shears, the combination of a pair of pivoted together shear elements each comprising a main shear member having a handle on one end thereof, offset relative to the other for clearance therebetween and over a hedge which is being trimmed, a cross shear member transversely of each of said main shear members and having a depresison formed therein to fit the cross member over the corresponding one of said main shear members to permanently relate the corresponding cross member to its main member, a pivot pin extending through all of said members to allow pivotal movement of each main member and cross member thereon relative to the other main member and cross member thereon, a nut threaded onto said pivot pin to easily releasably hold all of said members together and to adjust the contact relations between said main and cross members, cutting edges on both edges of said main and cross members, and at least one of said edges being sinuous.

2. In a hand operated, double acting hedge trimming shears, the combination of a pair of pivoted together shear elements each comprising a main shear member having a handle on one end thereof, offset relative to the other for clearance therebetween and over a hedge which is being trimmed, a cross shear member transversely of each of said main shear members and having a depression formed therein to fit the cross member over the corresponding one of said main shear members to permanently relate the corresponding cross member to its main member, a pivot pin extending through all of said members to allow pivotal movement of each main member and cross member thereon relative to the other main member and cross member thereon, a nut threaded onto said pivot pin to easily releasably hold all of said members together and to adjust the contact relations between said main and cross members, and cutting edges on both edges of said main and cross members and being sinuous and all being in one plane and each extending from a point outwardly of said pivot to the end of the corresponding shear member.

3. In a hand operated, double acting hedge trimming shears, the combination of a pair of pivoted together shear elements, each comprising a main shear member and a cross shear member, each of said main shear members having a handle on one end thereof, offset to one side so that one clears the other and also the hedge which is being trimmed, each of said cross shear members having a depression formed therein, transversely thereof to fit easily releasably over the corresponding main shear member to retain the cross shear members to their main shear members while the trimming shears is assembled, a pivot pin extending through all of said shear members to allow relative pivotal movement of said elements, a nut threaded onto said pivot pin to easily releasably hold said elements together and to adjust the contact relation between said shear members, and cutting edges on both edges of said shear members.

4. In a hand operated, double acting, self sharpening, hedge trimming shears, the combination of a pair of pivoted together shear elements, each comprising a main shear member and a cross shear member, each of said main shear members having a handle on one end thereof, offset to one side so that one clears the other and can pass over the other and an operator's hand and fingers clear the hedge which is being trimmed, each of said cross shear members having a depression formed therein, transversely thereof to fit easily releasably over the corresponding main shear member to retain the cross shear members in relationship to their main shear members while the trimming shears is assembled, all of said shear members being concave transversely to provide cutting clearance, the concavity of one set of shear members being opposite the concavity of the other set, a pivot pin extending through all of said shear members to allow relative pivotal movement of said elements, a nut threaded onto said pivot pin to easily releasably hold said elements together and to adjust the contact relationship between said shear members and to effect self sharpening thereof by and during use of the trimming shears, cutting edges on both edges of said shear members, and at least one of said cutting edges being sinuous.

5. In a trimming shears, a pair of pivoted together trimming elements each comprising a main trimming member and a cross trimming member, the latter having a depression therein fitting over the corresponding main trimming member to hold the same in relationship.

JAMES CIOCIA.